United States Patent [19]

Endl

[11] 3,742,222
[45] June 26, 1973

[54] PHOTOELECTRIC SENSING SYSTEM
[76] Inventor: Alfons Endl, c/o Endl Elektronik GmbH Co., Paul-Hasch-Strasse 40, 8 Munich 60, Germany
[22] Filed: Feb. 9, 1971
[21] Appl. No.: 114,001

[30] Foreign Application Priority Data
Feb. 20, 1970 Germany.............P 20 07 840.4

[52] U.S. Cl...... 250/209, 250/217 SS, 250/219 LG, 250/220 R, 340/258 B
[51] Int. Cl......................... H01j 39/12, G08b 13/18
[58] Field of Search ...................... 250/209, 219 LG, 250/220, 221, 222, 217 SS; 307/311; 328/2; 340/258 R, 258 B, 258 D

[56] References Cited
UNITED STATES PATENTS
3,563,666  2/1971  Foster ......................... 250/222 R X
3,428,817  2/1969  Hofmeister et al........... 250/219 LG
3,584,224  6/1971  Harlem ......................... 250/220 X
3,549,890  12/1970  Keller ............................ 250/220 X
3,413,480  11/1968  Baird et al. .................... 250/209 X
3,142,761  7/1964  Rabinow........................ 250/219 CR Primary Examiner—John S. Heyman
Assistant Examiner—L. N. Anagnos
Attorney—Hofgren, Wegner, Allen, Stellman & McCord

[57] ABSTRACT

A multiple light beam sensing system with pulsed light sources, plural light sensors and a digital circuit responsive to each of the sensors to detect the interruption of light to any sensor. One digital detector circuit uses an AND gate; and another has a series of bistable circuits actuated between stable states by pulses from the sensors. An output signal is present so long as no beam is broken. The interruption of one beam or the failure of any component is indicated by the loss of the output signal.

A current generator light sensor is shunted by an inductor which has a low impedance at the frequency of ambient light and a high impedance at the light source pulse repetition rate, providing a high degree of discrimination against ambient light.

The light source and light sensor are mounted adjacent each other at one side of the sensing area. A reflector is mounted at the other side. A single lens directs light from the source to the reflector and directs reflected light to the sensor.

15 Claims, 15 Drawing Figures

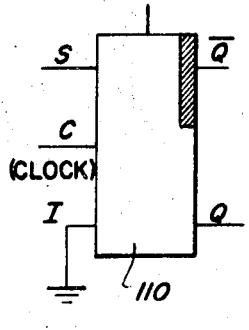
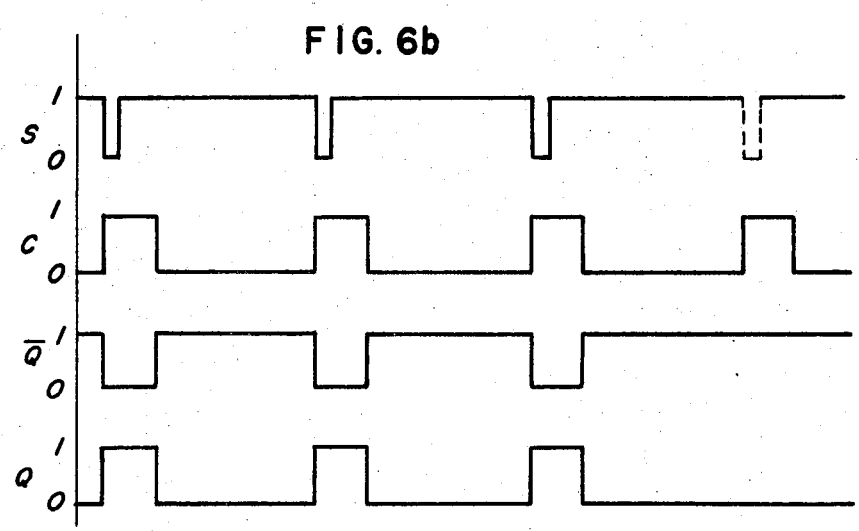
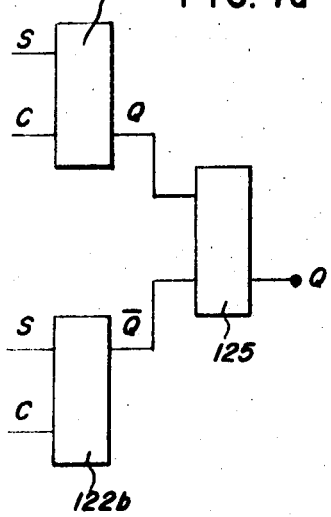
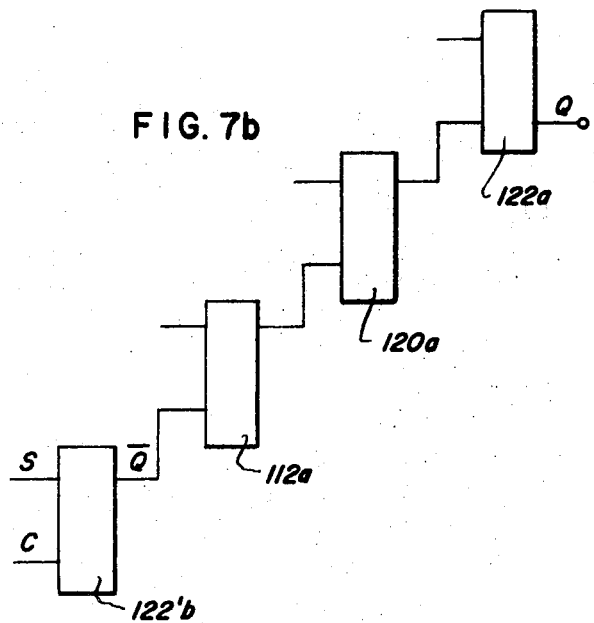
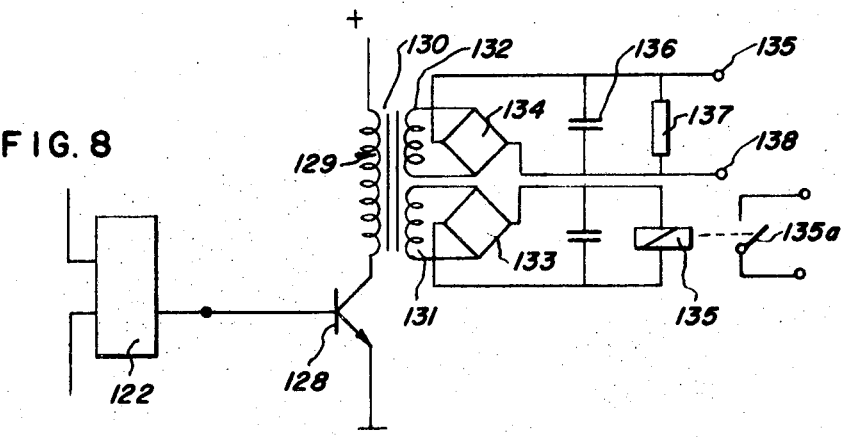

PHOTOELECTRIC SENSING SYSTEM

This invention relates to a photoelectric sensing system and more particularly to a system utilizing multiple light beams and multiple light sensors for establishing an area of light to detect the presence of an object blocking one or more beams in the area.

Prior multiple light beam system have depended on a variation in the total light received to detect the interruption of a beam. The received light is converted into an electrical signal which may be amplified and the level of the signal used to provide an output. To respond to a small object, the setting of the level sensor is quite critical. Changes in the ambient light, temperature, humidity, aging of components and the like may cause false signals.

A principal feature of the invention is the utilization of a digital detector means responsive to the light sensors for each of the plural light beams to determine when one beam is broken. The digital detector eliminates the amplitude sensitive circuitry of the prior analog systems. Two forms of digital detector are shown. In one, the outputs of the light sensors are connected with the inputs of an AND gate. So long as all inputs to the gate are present, there is an output which indicates that no beam is broken. Interruption of any beam removes the output from the AND gate. In the other, the light sources are pulsed and the pulse outputs of the light sensors are connected with bistable detector circuits which reverse condition with pulses from successive sensors. An alternating output from the bistable circuits indicates that no beam is broken. When any beam is broken, the alternating output ceases.

Another feature of the invention is that the system is "fail safe". The digital detector with an alternating output has a utilization circuit AC coupled to its output. Failure of any component in the circuit, before or after the detector, provides the same indication that occurs when a beam is broken.

A further feature of the invention is that the light source is actuated at a rate higher than the frequency of ambient light and a filter circuit is connected with the light sensor to discriminate against the ambient light frequency. This greatly reduces the sensitivity of the system to ambient light and permits its use without special shielding.

Still another feature of the invention is that the light source is capable of emitting light over a range of intensities. The light sensor is connected with a detector for determining when the light beam is interrupted and the detector is in turn connected with the light source to reduce the light intensity upon interruption of the beam. This prevents the establishment of an unstable condition in the system with a small object between the source and sensor.

Yet a further feature of the invention is the provision of a retroreflective system utilizing a single lens between the reflector and light source for collimating light from the source and directing it toward the reflector and for focusing reflected light on the sensor. The lens has a first generally convex surface and a second surface with two planar portions angularly displaced, one portion refracting light from the source toward the reflector and the second portion refracting light from the reflector toward the sensor.

In a particular system utilizing a plurality of retroreflective units with such lenses, the units are mounted side by side with the lenses oriented so that light from the source which is reflected from the lens is dissipated laterially and does not affect other units.

Further features and advantages of the invention will readily be apparent from the specification and from the drawings, in which:

FIG. 1 is a diagrammatic illustration of a system embodying the invention;

FIG. 2,(a–c) are diagrams of signals illustrating the operation of the system of FIG. 1;

FIG. 6a is a diagrammatic illustration of one of the bistable circuits of FIG. 5;

FIG. 6b is a diagram of voltage waves illustrating the operation of the bistable circuit of FIG. 6a;

FIG. 7a is a partial circuit illustrating a modification of the system of FIG. 5;

FIG. 7b is a partial circuit illustrating another modification of the system of FIG. 5;

FIG. 8 is a partial circuit illustrating the development of an alternating current output from the circuit of FIG. 5;

Systems of the character described herein may be used as a safety device, projecting light beams across a protected area or zone and establishing an output signal or condition if an object enters the protected area, to give a warning or stop a machine, for example. In the past, plural lamps and photo sensors have been utilized with the outputs of the sensors connected together and with a level detector circuit. Often two or more plural light beam systems have been used to protect the same area, providing an increased measure of safety. However, in addition to the sensitivity problems discussed above of analog light responsive systems, systems with individual amplifiers and relays require many components and have as a result a high failure rate. It is further known to provide monitoring circuits to identify failures, but the further increase in the number of components aggravates the failure problem increasing service costs and reducing the efficiency of the machine.

In accordance with the invention, multiple light beams form a sensing field and an indication of the presence of an object in the field is obtained if any light beam is broken or on failure of any component. Separate monitoring circuits are not required.

Figure 1:
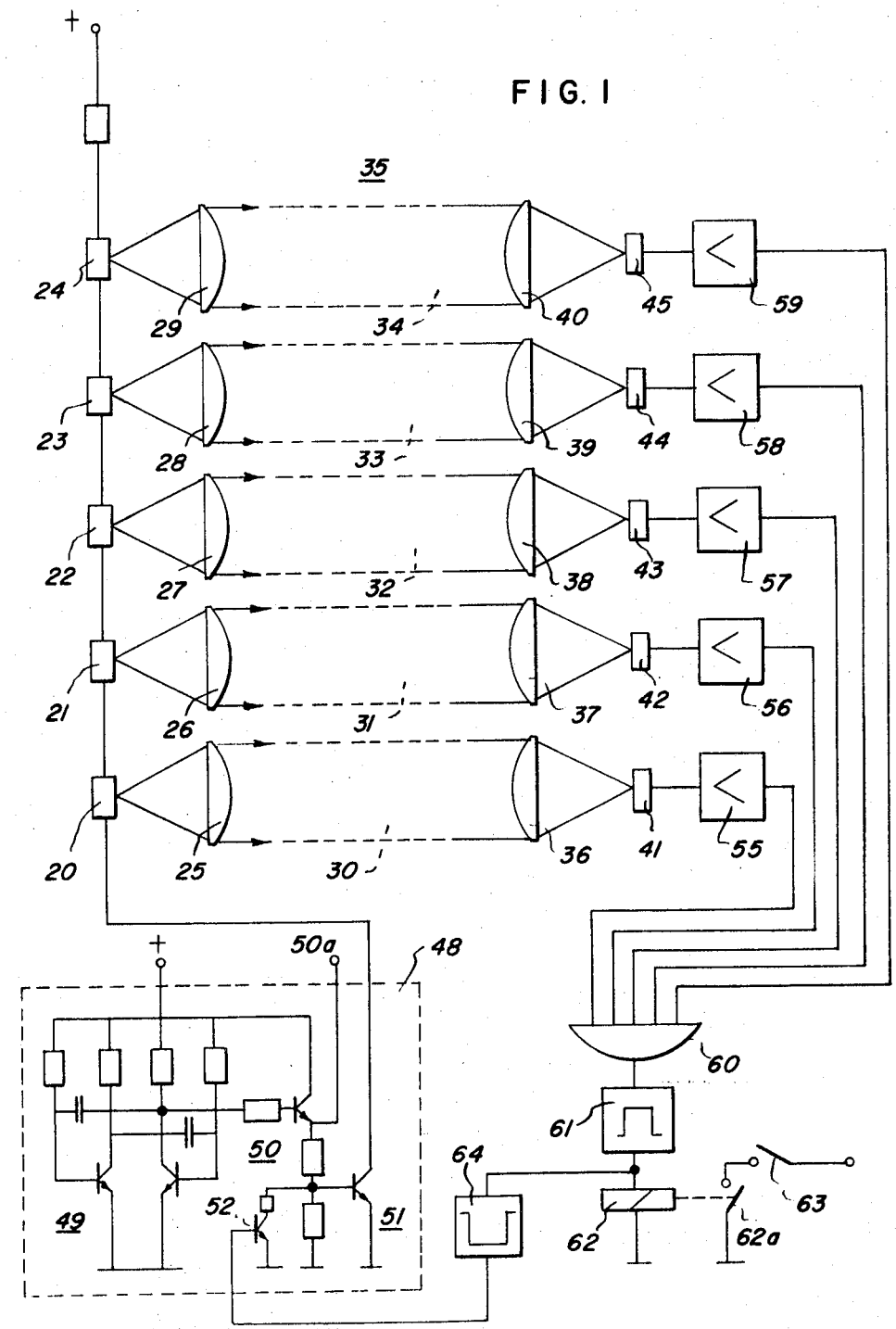
Figure 2:
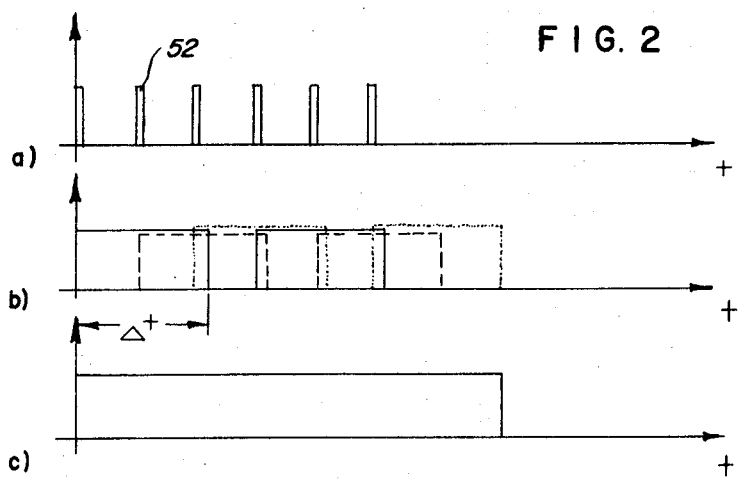

In FIG. 1, the sensing system has five light sources or lamps 20–24, preferably light emitting semiconductor diodes (LED), with the light from each source directed by lenses 25–29 in separate collimated beams 30–34 across an area 35 to be protected. The light in each beam is focused by lenses 36–40 on associated light sensors 41–45. The light sources 20–24 are preferably operated intermittently by a series of pulses from signal source 48, which includes an oscillator 49, an emitter follower 50 and a driver 51. The light sources are connected in series with the output circuit of driver 51 and are actuated simultaneously. The pulses from signal source 48 are illustrated in FIG. 2a, and may, for example, have a frequency or repetition rate of 5 KHz and a duration of 10 microseconds. The short duty cycle prolongs the diode life and minimizes the heat generated.

The signals derived from the light sensors 41–45, which may be light sensitive semiconductor diodes, are substantially the same as the pulses driving the light sources. These signals are connected through separate amplifiers 55–59 to the inputs of an AND gate 60. So long as no light beam is interrupted, the output of AND gate 60 will be a similar train of 10 microsecond pulses. These pulses are connected with a time delay or pulse stretcher circuit 61, the output of which is connected with a DC relay 62. The output of the time delay circuit is a pulse having a duration $\Delta t$ which is slightly greater than the period of two of the pulses 52 which actuate the light sources. FIG. 2b illustrates by pulses shown in solid, broken and dotted lines how the successive input pulses from AND gate 60 to delay circuit 61 provide a continuous output. (The difference in amplitude illustrated in FIG. 2b is for the purpose of identifying the different pulses. In practice the amplitude will be the same.) The output of pulse former 61, for a continuous train of input pulses, is a continuous signal illustrated at FIG. 2c. This signal is connected with a DC relay 62 and, so long as no light beam is broken, the relay remains energized. A contact 62a of relay 62 is connected in series with manual switch 63 in a circuit to control the operation of the protected machine, not shown. If any one or more of beams 30–34 is broken, there is no output from AND gate 60 and relay 62 is de-energized, opening contact 62a.

Additional driver circuits for the light sources of other systems may be energized from output 50a of emitter follower 50.

When a light beam is broken it is desirable to reduce the intensity of all the light beams. This provides hysteresis in the system, preventing an unstable condition which might occur, for example, when a small object is present in the sensing field. The output of pulse stretcher 61 is connected through inverter 64 with a transistor switch 52 across the input of driver 51. In the absence of an output from AND gate 60, the output of pulse stretcher 61 goes to zero. Inverter 64 has an output causing transistor 52 to conduct, reducing the amplitude of the input signal to driver 51 and thus the light source intensity.

Figure 3:
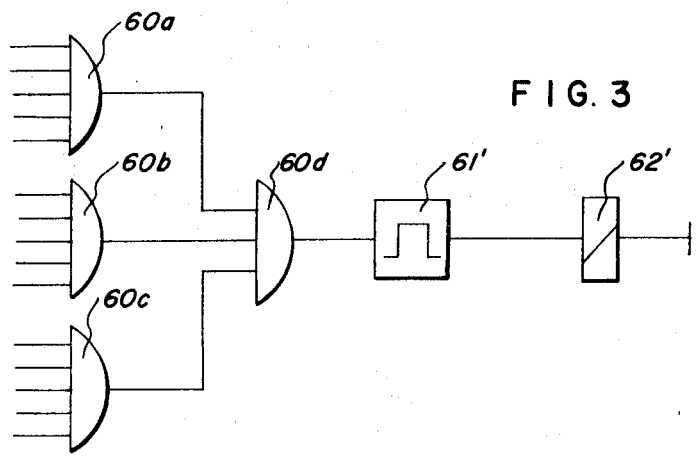
FIG. 3 is a diagram of a modification of the system of FIG. 1.

If the number of light beams used in a given protective system is too great for a single AND gate, the outputs may be cascaded as shown in FIG. 3. Here, three AND gates 60a, 60b and 60c provide for inputs from 15 light sensors. The outputs of each of the first rank of AND gates are connected with inputs of a further AND gate 60d, having its output connected with a pulse forming circuit 61' which in turn energizes a DC relay 62', so long as all inputs to the AND gates 60a, 60b and 60c are present.

It is sometimes desirable to use a retroreflective photosensing system in which the light source and light sensor are located adjacent each other on one side of the protected area. Light from the source is directed across the area where it strikes a mirror and is reflected back to the sensor. Such systems have in the past used multiple lens optical systems are shown, for example, in German Pat. No. 1,297,006.

Figure 4:
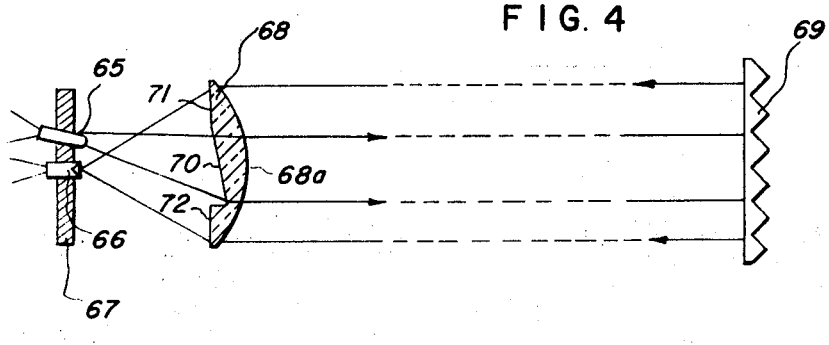
FIG. 4 is a diagrammatic illustration of a retroreflective sensing system utilzing a single lens.

FIG. 4 shows an improved optical system having a single lens. Light source 65 and light sensors 66 are mounted side by side in a carrier plate 67. Planoconvex lens 68 has its planar surface facing the carrier plate and its convex surface 68a facing reflector 69. The center portion 70 of the planar surface of lens 68 refracts light from source 65 through the lens and in a collimated beam toward reflector 69. The planar outer portions 71 and 72 of the lens refract the reflected light to light sensor 66. The sensor has its sensitive surface at the focal point of the outer portions 71, 72. The light source 65 is mounted at the focal point of lens portion 70. The angle between surface portions 70 and 71, 72 (approximately 10°) is such that the focal points for the two portions are spaced to allow mounting the light source 65 and sensor 66 side by side. Further features of the single lens sytems will be discussed below.

Figure 5:
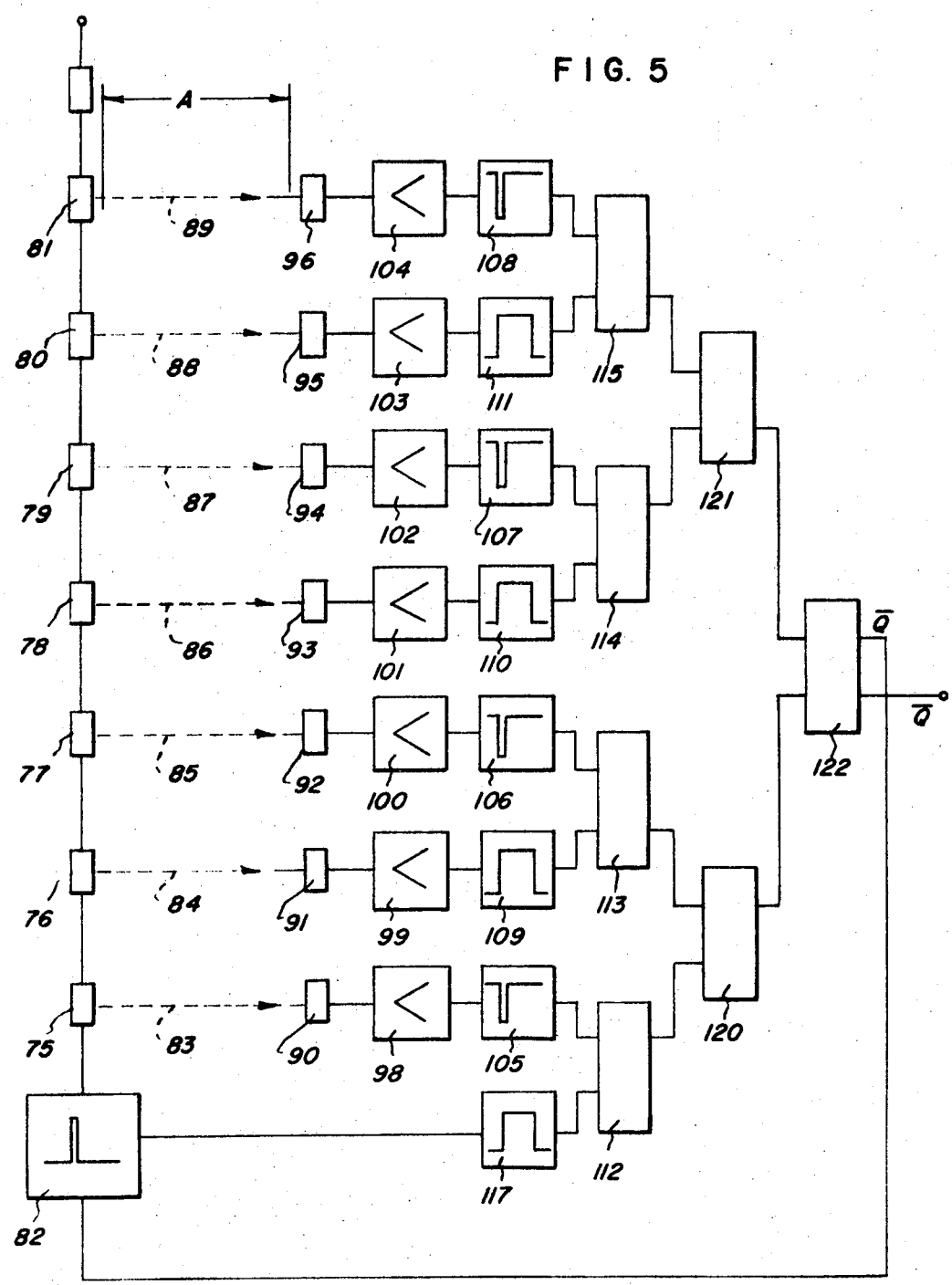
FIG. 5 is a diagrammatic illustration of a preferred form of the multibeam digital detecting system.

FIG. 5 illustrates a preferred embodiment of the digital detector for a multiple beam photoelectric sensing system. Seven lamps 75–81 are connected in series with a pulse source 82, the output of which may be the same as that of pulse source 48, FIG. 1, a series of pulses with a frequency of 5 KHz and a pulse width of 10 microseconds. Light from the lamps 75–81 is directed across an area A in separate beams 83–89 to light sensors 90–96. If desired, a retroreflecting system in which the light sensors are lovated adjacent the light sources may be used. The output of each light sensor is a current pulse corresponding with the light pulse from the related source. The current pulses are connected with amplifiers 98–104. The pulses from amplifiers 98, 100, 102 and 104 are connected with inverting amplifiers 105–108, while the pulses from amplifiers 99, 101 and 103 are connected with time delay or pulse stretcher circuits 109–111.

The digital detector utilizes a series of bistable circuits connected with the outputs of the inverting amplifiers and pulse stretchers.

The bistable circuit operation is illustrated in FIGS. 6a and 6b. Here, bistable circuit 112 has two inputs identified as S and C (or Clock). The inverted pulses shown at S in FIG. 6b are connected with the S input. The stretched pulses, shown at C in FIG. 6b, are applied to the C input. The bistable circuit outputs are identified as $\bar{Q}$ and Q and the signals appearing at the outputs are shown in FIG. 6b. So long as both S and C inputs are present, the Q output goes from 0 to 1 when the S input goes from 1 to 0; and goes from 1 to 0 when the C input goes from 1 to 0. The $\bar{Q}$ output is a complementary signal, going from 1 to 0 when the S input goes from 1 to 0 and from 0 to 1 when the C input goes from 1 to 0. So long as both S and C pulse inputs are present, both the Q and $\bar{Q}$ outputs are alternating signals having a frequency of 5 KHz. If an S input is missing, the Q output remains at the 0 level and $\bar{Q}$ output remains at the 1 level, as indicated in the right hand portion of FIG. 6b. Conversely, if the C input is missing, the Q output will remain at the O level and $\bar{Q}$ output at the 1 level (not shown). The convention illustrated in FIG. 6a for locating the inputs and outputs of the bistable circuits is utilized in each of the bistable circuits in FIGS. 5, 7 and 8.

Returning to FIG. 5, there are four bistable circuits 112–115 connected with the outputs of the 7 light sensors 90–96. The outputs of the pulse inverters 105–108 are connected with the respective S inputs while the outputs of pulse stretchers 109–111 are connected with the respective C inputs. In the particular system illustrated, there are an odd number of light sensors. The second input for bistable 112 is obtained from pulse generator 82, connected through a pulse stretcher 117. In a system having only two light beams, the output from the single bistable network may be used directly to operate a control or indicator. Where, however, the system has a number of light beams n greater than 2, the (n/2) bistable circuits in the first row following the sensors are connected with (n/4) bistable circuits in a second row. In this manner the number of bistable circuits is successively reduced by one-half until (n/Z) = 1.

In the seven beam system of FIG. 5, the bistable circuits 112 and 113 are connected with bistable circuits 120 and bistable circuits 114 and 115 are connected with bistable circuit 121. In the third row, bistable circuit 122 is connected with the outputs of circuits 120 and 121. In each case, the Q output of one of the preceding bistables is connected with the S input of the succeeding bistable while the Q output of the other preceding bistable is connected with the C input of the succeeding bistable.

The Q output of bistable 122 in the system of FIG. 5 may be utilized to actuate a suitable indicator or control system.

The $\overline{Q}$ output of bistable 122 is connected with pulse generator 82, reducing the amplitude of the electrical pulse which drives light sources 75–81 when a light beam is broken, as discussed above.

If two systems of the character illustrated in FIG. 5 are utilized together, the outputs of the final bistable circuits of each may be combined in an additional bistable circuit. This is illustrated in FIG. 7a where bistable 122a represents the final stage of one unit and bistable 122b represents the final stage of a second unit. An additional bistable 125 has its S input connected with the Q output of bistable 122a and its C input connected with the $\overline{Q}$ output of bistable 122b. The output of bistable 125 represents the combined conditions of the two units.

If one of the intermediate bistables of one unit has an open input, two units may be combined as shown in FIG. 7b, rather than by providing the open input with a signal from the signal source 82. In FIG. 7b the suffix — a — represents bistables in one unit and — b — represents bistables in a second unit. The $\overline{Q}$ output of bistable 122b, the last in the chain of bistables of the second unit, is connected with the open C input of bistable 122a in the first unit. The other connections are as indicated in FIG. 5.

FIG. 8 illustrates an output and control circuit which may be used with the sensing system of FIG. 5. The output of bistable 122 (either Q or $\overline{Q}$) is connected with the base of transistor 128, connected in a grounded emitter circuit. The primary winding 129 of a transformer 130 is connected in the collector circuit of transistor 128. Transformer 130 has two secondary windings 131, 132, each connected with a bridge rectifier 133, 134, respectively. The output of rectifier 133 is connected with DC relay 135 having a contact 135a in a control circuit (as contact 62a, FIG. 1). The output of rectifier 134 is filtered by capacitor 136 and resistor 137, providing a DC control potential at terminals 138 which may be utilized to provide a visual indication or a control function.

So long as no light beam is interrupted and all of the elements of the system function properly, DC signals are present at the outputs of rectifiers 133 and 134. The interruption of any one light beam or the failure of any circuit component will break the chain of pulses and the altternating signal of the output of bistable 122 will be replaced by a steady potential. Regardless of whether transistor 128 is conducting or nonconducting, there is no AC signal to be coupled through transformer 130 to rectifiers 133, 134. The system provides fail safe operation without additional monitoring circuits.

Furthermore, the circuit checks itself at the frequency of the pulses from generator 82, rather than once each press stroke, which is common in prior monitoring systems.

Figure 9:
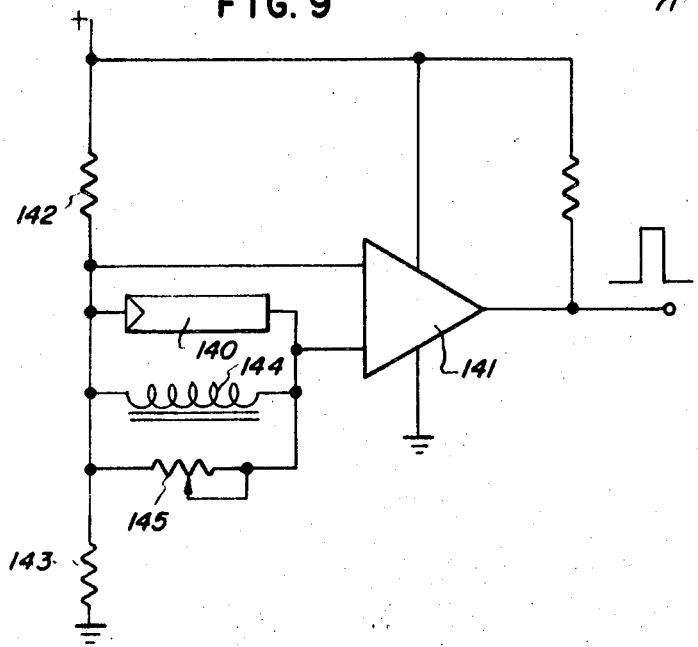
FIG. 9 is a diagram illustrating the filter network connected with the light sensor.

The sensitivity of photoelectric systems to ambient light has long been a problem. It is common to provide shielding around the light sensor to restrict the light reaching it to that which is emitted by the associated light source.

Where the system operates in a brightly lighted area, as is usually the situation in a manufacturing operation, it is impractical to screen the photo sensor from all ambient light; and it is necessary to reduce the sensitivity of the system so that it is not triggered by changes in the ambient light level. The use of a pulsed light source permits electrical filtering of the sensor output which substantially eliminates all ambient light effects. A suitable circuit is illustrated in FIG. 9. Here, the light sensor 140, a semiconductor photo diode which generates an electric current when exposed to light, is connected in one input circuit of operational amplifier 141. One terminal of the photo diode is connected with the input terminal of the amplifier and the other diode terminal is connected with a voltage divider including resistors 142 and 143 connected across a DC power source. The other input of amplifier 141 is also returned to the voltage divider. Connected in parallel with photo diode 140 is an inductor 144 and a variable resistor 145. In the absence of a current output from photo diode 140, there is no output from amplifier 141.

Most ambient light is of a relatively low frequency. The termmal lag in incandescent bulbs masks the usual power frequency of 50 or 60 Hz and the light is essentially continuous. Fluorescent bulbs emit light at a frequency twice that of the power frequency, i.e., 100 or 120 Hz. The repetition rate of the light pulses of the sensing system is 5 KHz, 40 or 50 times the frequency of fluorescent lights. Furthermore, as the pulse width is 10 microseconds, much of the signal energy has a frequency of 100 KHz. Inductor 144 is selected to have a high impedance at 100 KHz but a low impedance at the frequency of the ambient light. Thus, the output of light sensor 140 due to ambient light is effectively shorted, while the output from the light pulses is connected with amplifier 141. Adjustable resistor 145 damps ringing in inductor 144.

Figure 10:
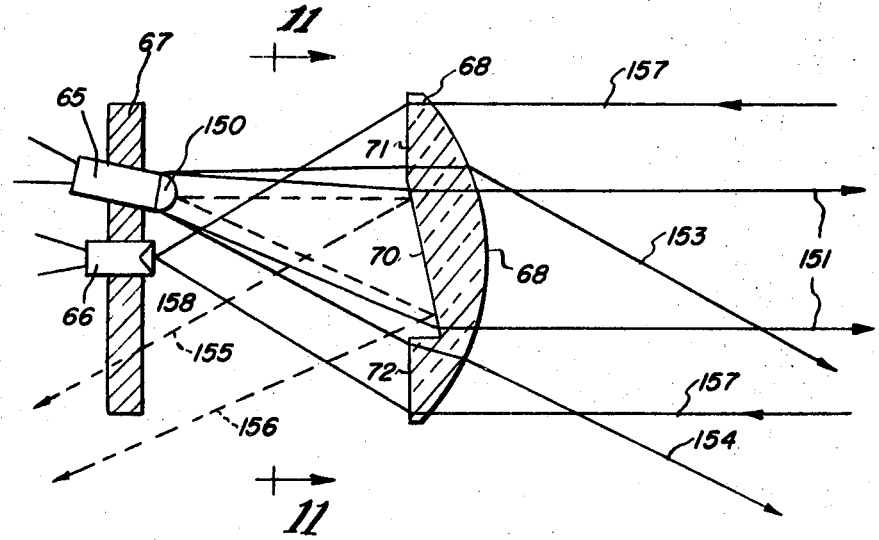
FIG. 10 is an enlarged diagram illustrating the relationships of the light source, light sensor and lens in a retroreflective system.

FIG. 10 illustrates on enlarged scale the lens 68 and its relation to light source 65 and light sensor 66. As pointed out above, planar lens portion 70 refracts light from source 65 and directs it in a beam toward the reflector. Reflected light is focused on the sensitive surface of sensor 66.

The light emitted from light source 65 is shaped by lens 150, a part of the LED, in a beam 151. The light source is spaced from sensor 66 a sufficient distance to avoid mechanical interference and is mounted in carrier 67 at an angle such that the center line of the light beam intersects planar surface portion 70 at the axis of the lens. The light beam is centered on surface portion 70. The angle of the light beam and the spacing between the light source and the lens are such that substantially all of the light energy strikes surface portion 70. This light is refracted through the lens and toward the reflector in a generally collimated light beam 151. Light which may strike the planar surface of the lens in portions 71 and 72, outside the prism portion 70, is refracted laterally as indicated by lines 153, 154.

Regardless of the quality of the lens or the coatings applied thereto, some light is reflected. The positional relationship of light source 65 and prism surface 70 is such that the reflected light is directed away from light sensor 66 as indicated by broken lines 155 and 156. This minimizes the background level of the signal from the light sensor.

Light 157 reflected to the lens and striking the outer portions thereof is focused on the sensitive surface 158 of the light sensor, located at the focal center of lens portion 71, 72.

The lens has dual focal points on both sides and may be reversed with respect to the light source and sensor if desired.

Figure 11:
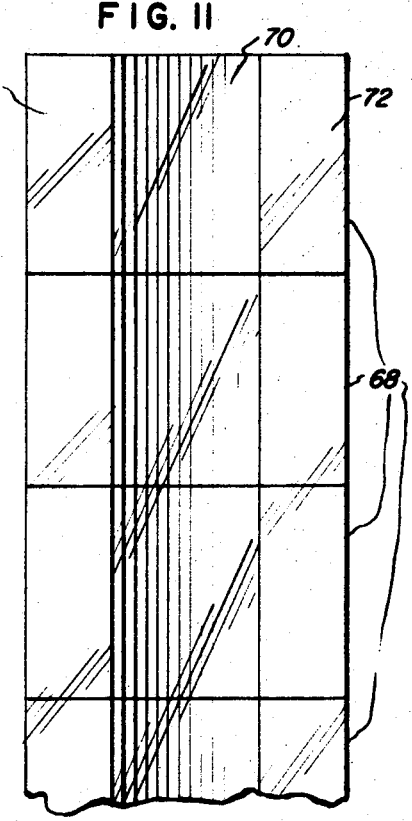
FIG. 11 is an elevational view of a plurality of lenses in a light curtain taken as indicated by line 11—11, FIG. 10.

In one embodiment of the invention, the lens 68 is rectangular in shape and several detecting elements (light source, detector lens and reflector) with such lenses are mounted adjacent each other so that the light beams 151 are parallel and constitute a light curtain or barrier, as described above. The lenses are oriented with the prism surfaces 70, 71, 72 aligned as indicated in FIG. 11. A consideration of FIGS. 10 and 11 will show that light striking the lens outside the prism surface (i.e., 153, 154) is refracted laterally of the lens assembly, will not strike the reflector and does not impinge on any of the light sensors. Similarly, light reflected from the rear surface of the lens is directed laterally of the lens assembly and does not strike adjacent light sensors even though no shield is provided between them.

It is convenient to stack seven detecting elements in one unit, using the circuit of FIG. 5. If additional area is to be covered, plural units may be stacked, with the outputs connected through an additional bistable circuit, as in FIG. 7a.

I claim:

1. A photoelectric system for determining when an object is within a defined space, comprising:
    light source means for projecting a plurality of adjacent parallel light beams through said defined space;
    oscillator means for generating periodically recurring pulses, connected with said light source means whereby said light beams are pulsed in accordance therewith;
    a plurality of light sensors corresponding to said plurality of light beams and each located for intercepting a different one of said light beams to produce a pulsed signal dependent on receipt of the corresponding pulsed light beam; and
    digital detector means having a plurality of signal inputs each coupled to a different one of said light sensors for producing a first output signal, indicating the absence of an object within the defined space during receipt of pulsed light beams at each input, and a second output signal, indicating the presence of an object within said defined space upon interruption of any one of said pulsed light beams.

2. The photoelectric system of claim 1 wherein said digital detector means produces an output dependent on the signals at the inputs, said digital detector means being sensitive to the receipt of a light beam by each light sensor and insensitive to the total quantity of light received by the plurality of light sensors.

3. The photoelectric system of claim 1 wherein each input of said digital detector means assumes one of two states, each light sensor being coupled to a different one of said plurality of inputs such that signals above a predetermined value correspond to an input of one state and signals below said predetermined value correspond to an input of the other state.

4. The photoelectric system of claim 3 wherein said digital detector means comprises logic means for producing one of two states at an output only when all of said plurality of inputs assume a common state, and switching means responsive when said output of said logic means assumes the other of said two states to indicate the presence of said object.

5. The photoelectric system of claim 4 wherein said switching means includes pulse stretcher means having an input coupled to the output of said logic means and an output for opening or closing a circuit to indicate the presence of said object, said pulse stretcher means being responsive to said one state to generate an output pulse having a time period in excess of the time period of the pulses from said oscillator means.

6. The photoelectric system of claim 3 wherein said digital detector means includes bistable means for establishing an output dependent on the states at a pair of inputs, and means coupling one of said light sensors to one of said inputs and means coupling another of said light sensors to the other of said inputs.

7. The photoelectric system of claim 6 wherein said digital detector means produces an indication of the absence of an object when the output of said bistable means continuously alternates between two stable states.

8. The photoelectric system of claim 7 wherein said light source means projects a plurality of light beams in excess of two, said digital means includes at least two additional bistable means each having a pair of inputs and an output, said coupling means includes means coupling one of said photo detectors in excess of two to an input of one of said additional bistable means, circuit means for providing a signal to the remaining input of said one additional bistable means, and said digital means includes means connecting an output of the first named bistable means to one input of the other additional bistable means and means coupling the output of said one additional bistable means to the other input of said other additional bistable means, said output of said bistable means corresponding to the output of said other additional bistable means.

9. The photoelectric system of claim 8 in which said light source means produces an odd number of light beams, and said circuit means couples the oscillator means to said remaining input of said one additional bistable means.

10. The photoelectric system of claim 7 wherein said digital detector means incldues rectifier means for producing a continuous signal when said bistable means has said continuously alternating output, AC coupling means for connecting said rectifier means to said output of said bistable means, and means responsive when the continuous signal of said rectifier means terminates for indicating the presence of said object.

11. The photoelectric system of claim 3 wherein said digital detector means includes bistable means for establishing an output dependent on the states at a pair of inputs, and said digital detector means includes means coupling one of said light sensors to one of said inputs of said bistable means, and means coupling said oscillator means to the other of said inputs of said bistable means.

12. The photoelectric system of claim 1 wherein said light source means comprises a plurality of light emitting semiconductor diodes for emitting radiation when energized by a pulse, in which said oscillator means is connected to each of said diodes, wherein the radiation from each diode corresponds to one of said light beams.

13. The photoelectric sensing system of claim 1 wherein the first output signal of said digital detector means is an alternating signal and the second output signal has no alternating component, and including a transformer connected with the output of the digital detector means and a utilization circuit connected through said transformer to the output of said digital detector.

14. The photoelectric system of claim 1, operable in an environment subject to interfering ambient light which is continuous or at a low frequency, wherein the pulses generated by said oscillator means have a frequency higher than the frequency of the ambient light, said system including a means having a high frequency pass characteristic for filtering the signals from said light sensors so that only high frequency components thereof are connected with the inputs of said digital detector means.

15. A photoelectric detector comprising:
a plurality of light sources;
a plurality of light sensors receiving light from said plurality of sources; detector means responsive to said light sensors for sensing the interruption of light received by any one sensor; and means responsive to said detector means for reducing the intensity of light emitted from all of said light sources upon the interruption of the light received by one of said sensors.

* * * * *